(12) United States Patent
Hsu et al.

(10) Patent No.: US 9,794,557 B2
(45) Date of Patent: Oct. 17, 2017

(54) METHOD AND APPARATUS OF SIMPLIFIED LUMA-BASED CHROMA INTRA PREDICTION

(71) Applicant: MEDIATEK Singapore Pte. Ltd., Singapore (SG)

(72) Inventors: Juliana Hsu, Aachen (DE); Mei Guo, San Jose, CA (US); Xun Guo, Beijing (CN)

(73) Assignee: MEDIATEK SINGAPORE PTE. LTD, Singapore (SG)

( * ) Notice: Subject to any disclaimer, the term of this patent is extended or adjusted under 35 U.S.C. 154(b) by 300 days.

(21) Appl. No.: 14/380,709

(22) PCT Filed: Jan. 24, 2013

(86) PCT No.: PCT/CN2013/070912
§ 371 (c)(1),
(2) Date: Aug. 23, 2014

(87) PCT Pub. No.: WO2013/155886
PCT Pub. Date: Oct. 24, 2013

(65) Prior Publication Data
US 2015/0036745 A1    Feb. 5, 2015

(30) Foreign Application Priority Data

Apr. 16, 2012   (WO) ................ PCT/CN2012/074118

(51) Int. Cl.
*H04N 19/593*   (2014.01)
*H04N 19/186*   (2014.01)
*H04N 19/42*   (2014.01)

(52) U.S. Cl.
CPC ..... *H04N 19/00763* (2013.01); *H04N 19/186* (2014.11); *H04N 19/42* (2014.11); *H04N 19/593* (2014.11)

(58) Field of Classification Search
CPC ........... H04N 19/00763; H04N 19/186; H04N 19/42; H04N 19/593
See application file for complete search history.

(56) References Cited

U.S. PATENT DOCUMENTS 9,510,016 B2    11/2016  Gomila et al.
2002/0191701 A1*  12/2002  O'Brien, Jr. ........... H04N 19/40
                                                         375/240.27
(Continued)

FOREIGN PATENT DOCUMENTS

CN       102067609 A    5/2011
WO    WO 2012/044126    4/2012

OTHER PUBLICATIONS

Liu, L., et al.; "Non-CE6a Reduce the look-up table entries for LM mode calculation;" Joint Collaborative Team on Video Coding (JCT-VC) of ITU-T SG16 WP3 and ISO/IEC JTC1/SC29/WG11; Feb. 2012; pp. 1-5.

(Continued)

*Primary Examiner* — Jay Patel
*Assistant Examiner* — Joseph Suh
(74) *Attorney, Agent, or Firm* — McClure, Qualey & Rodack, LLP

(57) ABSTRACT

A method and apparatus for chroma intra prediction is based on reconstructed luma pixels and chroma pixels, where the chroma intra prediction is based on a linear model of derived co-located current luma pixels of the current luma block scaled by a scaling factor. The scaling factor comprises a product term of a division factor and a scaled covariance-like value associated with neighboring reconstructed luma and chroma pixels of a current block. The division factor is related to a first data range divided with rounding by a scaled variance-like value associated with the neighboring reconstructed luma pixels of the current block. The scaled covariance-like value, the first data range, or both of the scaled covariance-like value and the first data range are dependent on the internal bit depth, with which the chroma signal is processed during video coding process, according to an embodiment of the present invention.

30 Claims, 2 Drawing Sheets

(56) References Cited

U.S. PATENT DOCUMENTS

| | | | | |
|---|---|---|---|---|
| 2003/0016815 | A1* | 1/2003 | Kurtz | H04B 3/23 379/406.01 |
| 2006/0013320 | A1* | 1/2006 | Oguz | H04N 19/61 375/240.27 |
| 2008/0063047 | A1 | 3/2008 | Guo et al. | |
| 2011/0255591 | A1* | 10/2011 | Kim | H04N 19/107 375/240.02 |
| 2013/0182761 | A1 | 7/2013 | Chen et al. | |

OTHER PUBLICATIONS

Bross, B., et al.; "Working Draft 5 of High-Efficiency Video Coding;" Joint Collaborative Team on Video Coding (JCT-VC) of ITU-T SG16 WP3 and ISO/IEC JTC1/SC29/WG11; Nov. 2011; pp. 1-215.

Liu, L., et al.; "Remove the large multiplier for LM mode calculation;" Joint Collaborative Team on Video Coding (JCT-VC) of ITU-T SG16 WP3 and ISO/IEC JTC1/SC29/WG11; Feb. 2012; pp. 1-9.

Liu, L., et al.; "Reduce the look-up table entries for LM mode calculation;" Joint Collaborative Team on Video Coding (JCT-VC) of ITU-T SG16 WP3 and ISO/IEC JTC1/SC29/WG11; Feb. 2012; pp. 1-4.

Lee, S.H., et al.; "Intra prediction method based on the linear relationship between the channels for YUV 4:2:0 intra coding;" IEEE; 2009; pp. 1037-1040.

Juliana Hsu et al., Simplified Parameter Calculation for Chroma LM Mode, JCTVC-I0166, Joint Collaborative Team on Video Coding (JCT-VC) of ITU-T SG16 WP3 and ISO/IEC JTC1/SC29/WG11 9th Meeting: Geneva, May 7, 2012 (May 7, 2012) Retrieved from the internet:<URL:http://phenix.int-evry.fr/jct/doc_end_user/documents/9_Geneva/wg11/JCTVC-I0166-v1.zip> see the abstract, the sections 1-2.

* cited by examiner

METHOD AND APPARATUS OF SIMPLIFIED LUMA-BASED CHROMA INTRA PREDICTION

CROSS REFERENCE TO RELATED APPLICATIONS

The present invention claims priority to PCT Patent Application, Ser. No. PCT/CN2012/074118, filed Apr. 16, 2012, entitled "Improvements of Luma-based Chroma Intra Prediction". The PCT Patent Application is hereby incorporated by reference in its entirety.

BACKGROUND OF THE INVENTION

Field of the Invention

The present invention relates to video coding. In particular, the present invention relates to coding techniques associated with simplified chroma intra prediction based on reconstructed luma and chroma pixels.

Description of the Related Art

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra coding is required to compress the regions with high motion or scene changes. Besides, intra coding is also used to process an initial picture or to periodically insert I-pictures or I-blocks for random access or for alleviation of error propagation. Intra prediction exploits the spatial correlation within a picture or within a picture region. In practice, a picture or a picture region is divided into blocks and the intra prediction is performed on a block basis. Intra prediction for a current block can rely on pixels in neighboring blocks that have been processed. For example, if blocks in a picture or picture region are processed row by row first from left to right and then from top to bottom, neighboring blocks on the top and neighboring blocks on the left of the current block can be used to form intra prediction for pixels in the current block. While any pixels in the processed neighboring blocks can be used for intra predictor of pixels in the current block, very often only pixels of the neighboring blocks that are adjacent to the current block boundaries on the top and on the left are used.

The intra predictor is usually designed to exploit spatial features in the picture such as smooth area (DC mode), vertical line or edge, horizontal line or edge and diagonal line or edge. Furthermore, correlation often exists between the luminance (luma) and chrominance (chroma) components. Therefore, reconstructed luma pixels can be used to derive the intra chroma prediction. In recent development of High Efficiency Video Coding (HEVC), a chroma intra prediction method based on co-located reconstructed luma blocks has been disclosed. The type of chroma intra prediction is termed as LM prediction or LM mode. The main concept is to use the reconstructed luma pixels to generate the predictors of corresponding chroma pixels. FIG. 1A and FIG. 1B illustrate the prediction procedure. First, the neighboring reconstructed pixels of a co-located luma block in FIG. 1A and the neighboring reconstructed pixels of a chroma block in FIG. 1B are used to derive the correlation parameters between the blocks. Then, the predicted pixels of the chroma block are generated using the parameters and the reconstructed pixels of the luma block. In the parameters derivation, the first above reconstructed pixel row and the second left reconstructed pixel column of the current luma block are used. The specific row and column of the luma block are used in order to match the 4:2:0 sampling format of the chroma components. The following illustration is based on 4:2:0 sampling format. LM-mode chroma intra prediction for other sampling formats can be derived similarly.

In the Test Model Version 5.0 (HM-5.0), the LM mode is applied to predict chroma samples based on a linear model using reconstructed luma samples of the co-located prediction unit (PU). The parameters of the linear model consist of slope (a>>k) and y-intercept (b), where ">>" corresponds to the right shift operation. The parameters are derived based on the neighboring luma and chroma samples according to a least mean square criterion. The prediction sample, predSamples[x,y] for the chroma sample to be coded in the LM mode is derived as follows, where x,y=0 . . . nS−1 and nS corresponds to the block size.

First, variable k3 and the sample array pY' are derived as:

$$k3 = \text{Max}(0, \text{BitDepth}_C + \text{Log } 2(nS) - 14), \quad (1)$$

where $\text{BitDepth}_C$ denotes the internal chroma bit depth (i.e., the bit depth with which the chroma signal is processed during video coding process), and $$p_Y'[x,-1] = (P_{LM}[2x-1,-1] + 2 \cdot P_{LM}[2x,-1] + P_{LM}[2x+1,-1] + 2) >> 2, \quad (2)$$

$$p_Y'[-1,y] = (P_{LM}[-1,2y] + P_{LM}[-1,2y+1]) >> 1, \quad (3)$$

$$p_Y'[x,y] = (\text{recSamples}_L[2x,2y] + \text{recSamples}_L[2x,2y+1]) >> 1, \quad (4)$$

where x=0 . . . nS−1, $P_{LM}[x,y]$ denotes the neighboring reconstructed luma samples, and recSamplesL[x,y] denotes the current reconstructed luma samples of the co-located luma block. The sample array $p_Y'$ are derived from reconstructed luma samples. Accordingly, $p_Y'$ is also called derived co-located luma sample in this disclosure. In equations (2) through (4), $p_Y'[x,y]$ is only evaluated at positions co-located with the chroma samples.

In HM-5.0, the characteristics of the neighboring reconstructed luma samples and neighboring reconstructed chroma samples of the current block are used to determine the linear-model parameters a, k, and b for LM-mode chroma intra prediction. The derived co-located luma pixels of the current luma block can be derived from the current reconstructed luma pixels of the current luma block at pixel locations co-located with the chroma pixels of the current chroma block.

To exemplify the linear model relating the chroma intra prediction with the derived co-located luma pixels, a set of variable, including L, C, LL, LC and k2, are defined. Variables L, C, LL, LC and k2 are derived as follows.

$$L = \left( \sum_{y=0}^{nS-1} p_Y'[-1,y] + \sum_{x=0}^{nS-1} p_Y'[x,-1] \right) >> k3 \quad (5)$$

$$C = \left( \sum_{y=0}^{nS-1} p[-1,y] + \sum_{x=0}^{nS-1} p[x,-1] \right) >> k3 \quad (6)$$

$$LL = \left( \sum_{y=0}^{nS-1} p_Y'[-1,y]^2 + \sum_{x=0}^{nS-1} p_Y'[x,-1]^2 \right) >> k3 \quad (7)$$

$$LC = \left( \sum_{y=0}^{nS-1} p_Y'[-1,y] * p[-1,y] + \sum_{x=0}^{nS-1} p_Y'[x,-1] * p[x,-1] \right) >> k3 \quad (8)$$

$$k2 = \text{Log2}((2*nS) >> k3) \quad (9)$$

As shown in equations (5) through (8), L corresponds to the sum of reconstructed luma samples in the neighboring area of the current block, C corresponds to the sum of reconstructed chroma samples in the neighboring area of the current block, LL corresponds to the sum of squared reconstructed luma samples in the neighboring area of the current block, LC corresponds to the sum of cross-product of reconstructed luma samples and reconstructed chroma samples in the neighboring area of the current block. Furthermore, L, C, LL, and LC are right shifted by k3 bits to take into account of the internal bit depth with which the chroma signal is processed during video coding process (i.e., bitDepthC) and the block size (i.e., nS).

The linear-model parameters a, b and k are derived as follows.

$$a1 = (LC << k2) - L*C, \quad (10)$$

$$a2 = (LL << k2) - L*L, \quad (11)$$

$$k1 = \text{Max}(0, \text{Log 2}(\text{abs}(a2)) - 5) - \text{Max}(0, \text{Log 2}(\text{abs}(a1)) - 14) + 2, \quad (12)$$

$$a1s = a1 >> \text{Max}(0, \text{Log 2}(\text{abs}(a1)) - 14), \quad (13)$$

$$a2s = \text{abs}(a2 >> \text{Max}(0, \text{Log 2}(\text{abs}(a2)) - 5)), \quad (14)$$

$$a3 = a2s < 1 ? 0 : \text{Clip3}(-2^{15}, 2^{15}-1, (a1s*\text{lmDiv} + (1 << (k1-1))) >> k1), \quad (15)$$

$$a = a3 >> \text{Max}(0, \text{Log 2}(\text{abs}(a3)) - 6), \quad (16)$$

$$k = 13 - \text{Max}(0, \text{Log 2}(\text{abs}(a3)) - 6), \text{ and} \quad (17)$$

$$b = (L - ((a*C) >> k1) + (1 << (k2-1))) >> k2, \quad (18)$$

where lmDiv is specified in Table 1 for all a2s values.

Parameter a1 as defined in equation (10) corresponds to a covariance-like value associated with the neighboring reconstructed luma pixels of the current luma block and the neighboring reconstructed chroma pixels of the current chroma block. The covariance $\alpha(X,Y)$ associated with random variables X and Y are defined as $\sigma(X,Y) = E[XY] - E[X]E[Y]$, where $E[.]$ is the expected value of the underlying random variable. For a random variable with a uniform distribution, the expected value is equivalent to the average value. Variables L, C, LL, and LC as shown in equations (5) through 8 are right shifted by k3 bits, where k3 is related to the block size (i.e., nS). In other words, if the neighboring reconstructed luma pixels of the current luma block are considered as a first uniformly distributed random variable (i.e., X) and the neighboring reconstructed chroma pixels of the current chroma block are considered as a second uniformly distributed random variable (i.e., Y), a1 has a form similar to a covariance value for uniformly distributed random variables X and Y. In equation (10), LC is left shifted by k2 bits in order to match the scaling of L*C. Accordingly, a1 as defined in equation (10) has a covariance-like form associated with the neighboring reconstructed luma pixels of the current luma block and the neighboring reconstructed chroma pixels of the current chroma block. The covariance-like value may be scaled to a desired range and the scaling may be performed by left or right shifting the covariance-like value. For example, the scaling of the covariance-like value used in HM-5.0 is shown in equation (13).

Similarly, parameter a2 as defined in equation (11) corresponds to a variance-like value associated with the neighboring reconstructed luma pixels of the current luma block. The variance-like value may be scaled to a desired range and the scaling may be performed by left or right shifting the variance-like value. For example, the scaling of the variance-like value used in HM-5.0 is shown in equation (14). A division factor, lmDiv is then determined by dividing with rounding a first data range by a2s. In HM-5.0, the division with rounding by a2s is implemented using a look-up table as shown in Table 1. In HM-5.0, the first data range corresponds to $2^{15}$ (i.e., 215). Accordingly, lmDiv=$(2^{15} + a2s/2)/a2s$. An intermediate parameter, a3 is then determined according to a1s*lmDiv, where the product a1s*lmDiv is divided with rounding by 2k1 and the result is clipped between $-215$ and $215-1$ if a2s≥1. If a2s is less than 1, a3 is set to 0. In HM-5.0, derivation of a3 is shown in equation (15), where the division with rounding by 2k1 is implemented by right shifting. The right shifting in equation (15) is performed to reverse the shifting operations that are applied to a1 and a2 in equation (13) and equation (14).

Parameters a and k for the linear model are then determined based on a3 as shown in equations (16) and (17) respectively. The y-intercept, b is determined according to equation (18). Finally, the value of the prediction samples predSamples[x,y] is derived as:

$$\text{predSamples}[x,y] = \text{Clip1}_C(((p_Y'[x,y]*a) >> k) + b), \quad (19)$$

where x, y=0 ... nS−1 and $$\text{Clip1}_C(w) = \text{Clip3}(0, (1 << \text{BitDepth}_C) - 1, w)$$

$$\text{clip3}(t,u,v) = ((v<t)?t:((v>u)?u:v))$$

TABLE 1

| a2s | 1 | 2 | 3 | 4 | 5 | 6 | 7 | 8 |
|---|---|---|---|---|---|---|---|---|
| lmDiv | 32768 | 16384 | 10923 | 8192 | 6554 | 5461 | 4681 | 4096 |
| a2s | 9 | 10 | 11 | 12 | 13 | 14 | 15 | 16 |
| lmDiv | 3641 | 3277 | 2979 | 2731 | 2521 | 2341 | 2185 | 2048 |
| a2s | 17 | 18 | 19 | 20 | 21 | 22 | 23 | 24 |
| lmDiv | 1928 | 1820 | 1725 | 1638 | 1560 | 1489 | 1425 | 1365 |
| a2s | 25 | 26 | 27 | 28 | 29 | 30 | 31 | 32 |
| lmDiv | 1311 | 1260 | 1214 | 1170 | 1130 | 1092 | 1057 | 1024 |
| a2s | 33 | 34 | 35 | 36 | 37 | 38 | 39 | 40 |
| lmDiv | 993 | 964 | 936 | 910 | 886 | 862 | 840 | 819 |
| a2s | 41 | 42 | 43 | 44 | 45 | 46 | 47 | 48 |
| lmDiv | 799 | 780 | 762 | 745 | 728 | 712 | 697 | 683 |
| a2s | 49 | 50 | 51 | 52 | 53 | 54 | 55 | 56 |
| lmDiv | 669 | 655 | 643 | 630 | 618 | 607 | 596 | 585 |
| a2s | 57 | 58 | 59 | 60 | 61 | 62 | 63 | 64 |
| lmDiv | 575 | 565 | 555 | 546 | 537 | 529 | 520 | 512 |

As shown above, the derivation of the prediction sample, predSamples[x,y] is very computationally intensive. Not only it involves a large number of computations, it also requires buffer to store the table. Furthermore, some operations may require higher precision. For example, in equation (15), a1s is a signed 15-bit integer, therefore, a1s*lmDiv requires a 15-bit multiplier. This large multiplier introduces higher computational complexity. Therefore, it is desirable to simplify the derivation of the prediction sample.

BRIEF SUMMARY OF THE INVENTION

A method and apparatus for chroma intra prediction based on reconstructed luma pixels and chroma pixels are disclosed. The chroma intra prediction for chroma pixels of the current chroma block is based on a linear model of derived co-located current luma pixels of the current luma block scaled by a scaling factor. The scaling factor comprises a product term of a division factor and a scaled covariance-like value associated with the neighboring reconstructed luma pixels of the current luma block and the neighboring reconstructed chroma pixels of the current chroma block. The division factor is related to a first data range divided with rounding by a scaled variance-like value associated with the neighboring reconstructed luma pixels of the current luma block. In a system incorporating an embodiment of the present invention, the scaled covariance-like value, the first data range, or both of the scaled covariance-like value and the first data range are dependent on the internal bit depth with which the chroma signal is processed during video coding process.

In one embodiment, the scaled covariance-like value, a1s is derived according to a1s=a1>>Max(0, Log 2(abs(a1))−(BitDepthC−2)), where a1 represents the covariance-like value, and BitDepthC represents the internal bit depth with which the chroma signal is process in video codec. In another embodiment of the present invention, the first data range corresponds to 2^(BitDepthC+n), where n is an integer from −2 to +4. The division factor can be derived using a look-up table with the scaled variance-like value as the table input. Some table entries can be omitted depending on the selected first data range. Besides, the division factor can also be calculated by dividing with rounding by the scaled variance-like value during coding process.

DETAILED DESCRIPTION OF THE INVENTION

Figure 1A:
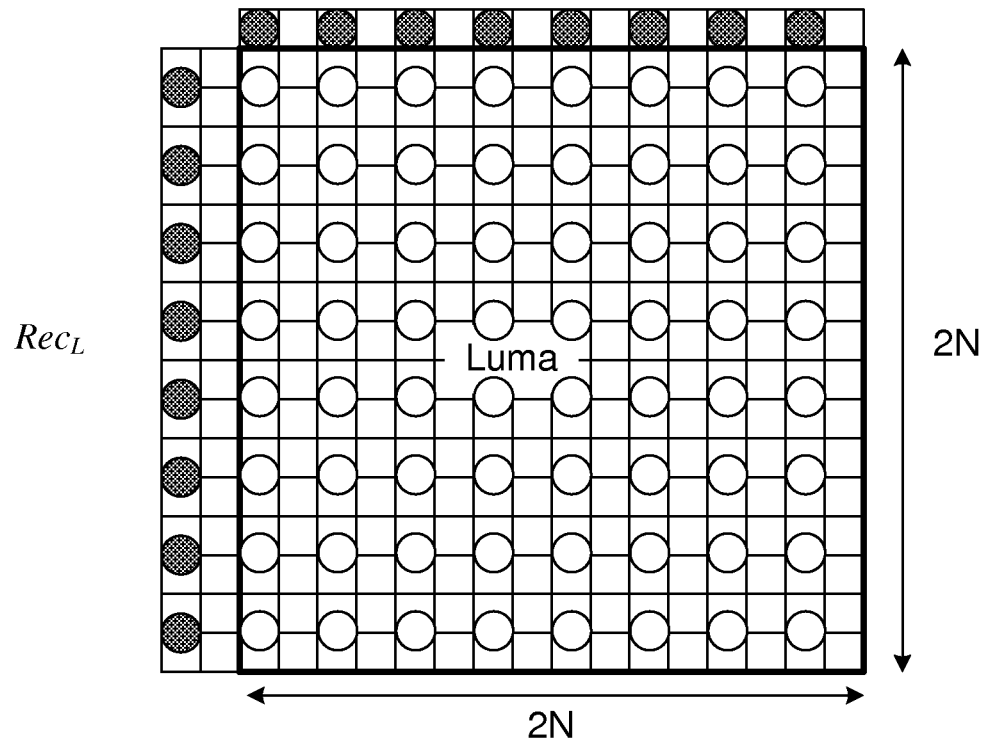
FIG. 1A illustrates an example of derived luma samples derived based on neighboring reconstructed luma pixels and current reconstructed luma samples for chroma intra prediction according to HM-5.0.
Figure 1B:
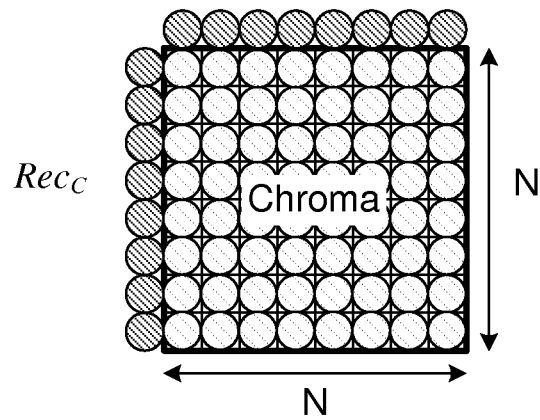
FIG. 1B illustrates an example of neighboring reconstructed chroma samples used for chroma intra prediction of current chroma samples.

As mentioned before, the existing LM mode derivation is quite complicated. Some operations require higher arithmetic accuracy, such as the a1s*lmDiv operation. Therefore, in one embodiment of the present invention, the complexity of the a1s*lmDiv operation is reduced by incorporating the internal bit depth, with which the chroma signal is processed during video coding process, in the a1s derivation. As an example, the shift operation for a1s incorporating an embodiment of the present invention becomes:

$$a1s = a1 >> \mathrm{Max}(0, \mathrm{Log}\, 2(abs(a1)) - (\mathrm{BitDepth}_C - 2)). \quad (20)$$

In equation (20), the constant value (i.e. 14) of equation (13) is replaced by (BitDepthC−2). Accordingly, the number of bits of a1s is limited to the bit depth of the chroma signal (i.e., BitDepthC) minus one and plus one sign bit. Furthermore, lmDiv is changed from (2^15+a2s/2)/a2s to (2^(BitDepthC−1)+a2s/2)/a2s. Therefore, lmDiv will be less than (2^BitDepthC) when a2s is equal to 1. As mentioned before, the derivation of lmDiv from a2s, i.e., lmDiv=(2^(BitDepthC−1)+a2s/2)/a2s, can be implemented as a look-up table. Table 2 illustrates the values of lmDiv for BitDepthC=8. Table 3 illustrates the values of lmDiv for BitDepthC=10.

TABLE 2

| a2s | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| lmDiv | 128 | 64 | 43 | 32 | 26 | 21 | 18 | 16 | 14 | 13 | 12 | 11 | 10 | 9 | 9 | 8 |
| a2s | 17 | 18 | 19 | 20 | 21 | 22 | 23 | 24 | 25 | 26 | 27 | 28 | 29 | 30 | 31 | 32 |
| lmDiv | 8 | 7 | 7 | 6 | 6 | 6 | 6 | 5 | 5 | 5 | 5 | 5 | 4 | 4 | 4 | 4 |
| a2s | 33 | 34 | 35 | 36 | 37 | 38 | 39 | 40 | 41 | 42 | 43 | 44 | 45 | 46 | 47 | 48 |
| lmDiv | 4 | 4 | 4 | 4 | 3 | 3 | 3 | 3 | 3 | 3 | 3 | 3 | 3 | 3 | 3 | 3 |
| a2s | 49 | 50 | 51 | 52 | 53 | 54 | 55 | 56 | 57 | 58 | 59 | 60 | 61 | 62 | 63 | 64 |
| lmDiv | 3 | 3 | 3 | 2 | 2 | 2 | 2 | 2 | 2 | 2 | 2 | 2 | 2 | 2 | 2 | 2 |

TABLE 3

| a2s | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| lmDiv | 512 | 256 | 171 | 128 | 102 | 85 | 73 | 64 | 57 | 51 | 47 | 43 | 39 | 37 | 34 | 32 |
| a2s | 17 | 18 | 19 | 20 | 21 | 22 | 23 | 24 | 25 | 26 | 27 | 28 | 29 | 30 | 31 | 32 |
| lmDiv | 30 | 28 | 27 | 26 | 24 | 23 | 22 | 21 | 20 | 20 | 19 | 18 | 18 | 17 | 17 | 16 |
| a2s | 33 | 34 | 35 | 36 | 37 | 38 | 39 | 40 | 41 | 42 | 43 | 44 | 45 | 46 | 47 | 48 |
| lmDiv | 16 | 15 | 15 | 14 | 14 | 13 | 13 | 13 | 12 | 12 | 12 | 12 | 11 | 11 | 11 | 11 |
| a2s | 49 | 50 | 51 | 52 | 53 | 54 | 55 | 56 | 57 | 58 | 59 | 60 | 61 | 62 | 63 | 64 |
| lmDiv | 10 | 10 | 10 | 10 | 10 | 9 | 9 | 9 | 9 | 9 | 9 | 9 | 8 | 8 | 8 | 8 |

Along with the new a1s as shown in equation (20) and lmDiv (i.e., $(2^{\wedge}(BitDepthC-1)+a2s/2)/a2s$) mentioned above, other variables that require modification are as follows:

$$k1 = \text{Max}(0, \text{Log } 2(\text{abs}(a2)) - 5) - \text{Max}(0, \text{Log } 2(\text{abs}(a1)) - (\text{BitDepth}_C - 2)), \quad (21)$$

$$k = \text{BitDepth}_C - 1 - \text{Max}(0, \text{Log } 2(\text{abs}(a3)) - 6). \quad (22)$$

In another embodiment, lmDiv is set to $(2^{\wedge}(BitDepthC-2)+a2s/2)/a2s$. Therefore, lmDiv is less than $(2^{\wedge}(BitDepthC-1))$ when a2s is equal to 1. Table 4 illustrates the values of lmDiv for BitDepthC=8. Table 5 illustrates the values of lmDiv for BitDepthC=10.

TABLE 4

| a2s | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| lmDiv | 64 | 32 | 21 | 16 | 13 | 11 | 9 | 8 | 7 | 6 | 6 | 5 | 5 | 5 | 4 | 4 |
| a2s | 17 | 18 | 19 | 20 | 21 | 22 | 23 | 24 | 25 | 26 | 27 | 28 | 29 | 30 | 31 | 32 |
| lmDiv | 4 | 4 | 3 | 3 | 3 | 3 | 3 | 3 | 3 | 2 | 2 | 2 | 2 | 2 | 2 | 2 |
| a2s | 33 | 34 | 35 | 36 | 37 | 38 | 39 | 40 | 41 | 42 | 43 | 44 | 45 | 46 | 47 | 48 |
| lmDiv | 2 | 2 | 2 | 2 | 2 | 2 | 2 | 2 | 2 | 2 | 1 | 1 | 1 | 1 | 1 | 1 |
| a2s | 49 | 50 | 51 | 52 | 53 | 54 | 55 | 56 | 57 | 58 | 59 | 60 | 61 | 62 | 63 | 64 |
| lmDiv | 1 | 1 | 1 | 1 | 1 | 1 | 1 | 1 | 1 | 1 | 1 | 1 | 1 | 1 | 1 | 1 |

TABLE 5

| a2s | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| lmDiv | 256 | 128 | 85 | 64 | 51 | 43 | 37 | 32 | 28 | 26 | 23 | 21 | 20 | 18 | 17 | 16 |
| a2s | 17 | 18 | 19 | 20 | 21 | 22 | 23 | 24 | 25 | 26 | 27 | 28 | 29 | 30 | 31 | 32 |
| lmDiv | 15 | 14 | 13 | 13 | 12 | 12 | 11 | 11 | 10 | 10 | 9 | 9 | 9 | 9 | 8 | 8 |
| a2s | 33 | 34 | 35 | 36 | 37 | 38 | 39 | 40 | 41 | 42 | 43 | 44 | 45 | 46 | 47 | 48 |
| lmDiv | 8 | 8 | 7 | 7 | 7 | 7 | 7 | 6 | 6 | 6 | 6 | 6 | 6 | 6 | 5 | 5 |
| a2s | 49 | 50 | 51 | 52 | 53 | 54 | 55 | 56 | 57 | 58 | 59 | 60 | 61 | 62 | 63 | 64 |
| lmDiv | 5 | 5 | 5 | 5 | 5 | 5 | 5 | 5 | 4 | 4 | 4 | 4 | 4 | 4 | 4 | 4 |

For the lmDiv (i.e., $(2^{\wedge}(BitDepthC-2)+a2s/2)/a2s$) mentioned above, variable k is defined as follows:

$$k = \text{BitDepth}_C - 2 - \text{Max}(0, \text{Log } 2(\text{abs}(a3)) - 6). \quad (23)$$

In yet another embodiment, lmDiv is set to $(2^{\wedge}(BitDepthC+2)+a2s/2)/a2s$. In this case, lmDiv will be less than $2^{\wedge}BitDepthC$ for a2s>=7. Accordingly, Table 6 illustrates the values of lmDiv for BitDepthC=8. Table 7 illustrates the values of lmDiv for BitDepthC=10. In Tables 6 and 7, there are no entries for a2s<7 since a2s is impossible to be any value from 1 to 6.

TABLE 6

| a2s | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|
| lmDiv | 146 | 128 | 114 | 102 | 93 | 85 | 79 | 73 | 68 | 64 | 60 | 57 | 54 | 51 | 49 |
| a2s | 22 | 23 | 24 | 25 | 26 | 27 | 28 | 29 | 30 | 31 | 32 | 33 | 34 | 35 | 36 |
| lmDiv | 47 | 45 | 43 | 41 | 39 | 38 | 37 | 35 | 34 | 33 | 32 | 31 | 30 | 29 | 28 |
| a2s | 37 | 38 | 39 | 40 | 41 | 42 | 43 | 44 | 45 | 46 | 47 | 48 | 49 | 50 | 51 |
| lmDiv | 28 | 27 | 26 | 26 | 25 | 24 | 24 | 23 | 23 | 22 | 22 | 21 | 21 | 20 | 20 |
| a2s | 52 | 53 | 54 | 55 | 56 | 57 | 58 | 59 | 60 | 61 | 62 | 63 | | | |
| lmDiv | 20 | 19 | 19 | 19 | 18 | 18 | 18 | 17 | 17 | 17 | 17 | 16 | | | |

TABLE 7

| a2s | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|
| lmDiv | 585 | 512 | 455 | 410 | 372 | 341 | 315 | 293 | 273 | 256 | 241 | 228 | 216 | 205 | 195 |
| a2s | 22 | 23 | 24 | 25 | 26 | 27 | 28 | 29 | 30 | 31 | 32 | 33 | 34 | 35 | 36 |
| lmDiv | 186 | 178 | 171 | 164 | 158 | 152 | 146 | 141 | 137 | 132 | 128 | 124 | 120 | 117 | 114 |
| a2s | 37 | 38 | 39 | 40 | 41 | 42 | 43 | 44 | 45 | 46 | 47 | 48 | 49 | 50 | 51 |
| lmDiv | 111 | 108 | 105 | 102 | 100 | 98 | 95 | 93 | 91 | 89 | 87 | 85 | 84 | 82 | 80 |
| a2s | 52 | 53 | 54 | 55 | 56 | 57 | 58 | 59 | 60 | 61 | 62 | 63 | | | |
| lmDiv | 79 | 77 | 76 | 74 | 73 | 72 | 71 | 69 | 68 | 67 | 66 | 65 | | | |

For the lmDiv (i.e., $(2^{(BitDepthC+2)}+a2s/2)/a2s$) mentioned above, variable a3 and k are defined as follows:

$$a3 = a2s<7?0:\text{Clip3}(-2^{15}, 2^{15}-1, a1s*\text{lmDiv}+(1<<(k1-1)))>>k1), \quad (24)$$

$$k = \text{BitDepth}_C + 2 - \text{Max}(0, \text{Log }2(\text{abs}(a3))-6). \quad (25)$$

In yet another embodiment, lmDiv is changed to $(2^{(BitDepthC+1)}+a2s/2)/a2s$ and this will ensure $\text{lmDiv}<2^{(BitDepthC-1)}$ for a2s>=7. Table 8 illustrates the values of lmDiv for BitDepthC=8. Table 9 illustrates the values of lmDiv for BitDepthC=10. In Tables 8 and 9, there are no entries for a2s<7 since a2s is impossible to be any value from 1 to 6.

TABLE 8

| a2s | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|
| lmDiv | 73 | 64 | 57 | 51 | 47 | 43 | 39 | 37 | 34 | 32 | 30 | 28 | 27 | 26 | 24 |
| a2s | 22 | 23 | 24 | 25 | 26 | 27 | 28 | 29 | 30 | 31 | 32 | 33 | 34 | 35 | 36 |
| lmDiv | 23 | 22 | 21 | 20 | 20 | 19 | 18 | 18 | 17 | 17 | 16 | 16 | 15 | 15 | 14 |
| a2s | 37 | 38 | 39 | 40 | 41 | 42 | 43 | 44 | 45 | 46 | 47 | 48 | 49 | 50 | 51 |
| lmDiv | 14 | 13 | 13 | 13 | 12 | 12 | 12 | 12 | 11 | 11 | 11 | 11 | 10 | 10 | 10 |
| a2s | 52 | 53 | 54 | 55 | 56 | 57 | 58 | 59 | 60 | 61 | 62 | 63 | | | |
| lmDiv | 10 | 10 | 9 | 9 | 9 | 9 | 9 | 9 | 9 | 8 | 8 | 8 | | | |

TABLE 9

| a2s | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|
| lmDiv | 293 | 256 | 228 | 205 | 186 | 171 | 158 | 146 | 137 | 128 | 120 | 114 | 108 | 102 | 98 |
| a2s | 22 | 23 | 24 | 25 | 26 | 27 | 28 | 29 | 30 | 31 | 32 | 33 | 34 | 35 | 36 |
| lmDiv | 93 | 89 | 85 | 82 | 79 | 76 | 73 | 71 | 68 | 66 | 64 | 62 | 60 | 59 | 57 |
| a2s | 37 | 38 | 39 | 40 | 41 | 42 | 43 | 44 | 45 | 46 | 47 | 48 | 49 | 50 | 51 |
| lmDiv | 55 | 54 | 53 | 51 | 50 | 49 | 48 | 47 | 46 | 45 | 44 | 43 | 42 | 41 | 40 |
| a2s | 52 | 53 | 54 | 55 | 56 | 57 | 58 | 59 | 60 | 61 | 62 | 63 | | | |
| lmDiv | 39 | 39 | 38 | 37 | 37 | 36 | 35 | 35 | 34 | 34 | 33 | 33 | | | |

For the lmDiv (i.e., $(2^{(BitDepthC+1)}+a2s/2)/a2s$) mentioned above, variable a3 and k is defined as follows:

$$a3 = a2s<7?0:\text{Clip3}(-2^{15}, 2^{15}-1, a1s*\text{lmDiv}+(1<<(k1-1)))>>k1), \quad (26)$$

$$k = \text{BitDepth}_C + 1 - \text{Max}(0, \text{Log }2(\text{abs}(a3))-6). \quad (27)$$

In another embodiment, lmDiv is set to $(2^{(BitDepthC+4)}+a2s/2)/a2s$ and a3 in equation (15) is set to zero for a2s<32. In this case, $\text{lmDiv}<2^{(BitDepthC)}$ for a2s>=32. Table 10 illustrates the values of lmDiv for BitDepthC=8. Table 11 illustrates the values of lmDiv for BitDepthC=10. There is no need for table entries corresponding to a2s<32 since lmDiv is set to 0 in this case.

TABLE 10

| a2s | 32 | 33 | 34 | 35 | 36 | 37 | 38 | 39 | 40 | 41 | 42 |
|---|---|---|---|---|---|---|---|---|---|---|---|
| lmDiv | 128 | 124 | 120 | 117 | 114 | 111 | 108 | 105 | 102 | 100 | 98 |
| a2s | 43 | 44 | 45 | 46 | 47 | 48 | 49 | 50 | 51 | 52 | 53 |
| lmDiv | 95 | 93 | 91 | 89 | 87 | 85 | 84 | 82 | 80 | 79 | 77 |
| a2s | 54 | 55 | 56 | 57 | 58 | 59 | 60 | 61 | 62 | 63 | |
| lmDiv | 76 | 74 | 73 | 72 | 71 | 69 | 68 | 67 | 66 | 65 | |

TABLE 11

| a2s | 32 | 33 | 34 | 35 | 36 | 37 | 38 | 39 | 40 | 41 | 42 |
|---|---|---|---|---|---|---|---|---|---|---|---|
| lmDiv | 512 | 496 | 482 | 468 | 455 | 443 | 431 | 420 | 410 | 400 | 390 |
| a2s | 43 | 44 | 45 | 46 | 47 | 48 | 49 | 50 | 51 | 52 | 53 |
| lmDiv | 381 | 372 | 364 | 356 | 349 | 341 | 334 | 328 | 321 | 315 | 309 |
| a2s | 54 | 55 | 56 | 57 | 58 | 59 | 60 | 61 | 62 | 63 | |
| lmDiv | 303 | 298 | 293 | 287 | 282 | 278 | 273 | 269 | 264 | 260 | |

For the lmDiv (i.e., $(2^{(BitDepthC+4)}+a2s/2)/a2s$) and a3 mentioned above, other variables that require modification are as follows:

$$a3 = a2s<32?0:\text{Clip3}(-2^{15}, 2^{15}-1, a1s*\text{lmDiv}+(1<<(k1-1)))>>k1), \quad (28)$$

$$k = \text{BitDepth}_C+4-\text{Max}(0, \text{Log } 2(\text{abs}(a3))-6). \quad (29)$$

In another embodiment, lmDiv is set to $(2^{(BitDepthC+3)}+a2s/2)/a2s$ and a3 in equation (15) is set to zero for a2s<32. In this case, lmDiv will be less than $2^{(BitDepthC-1)}$ for a2s>=32. Table 12 illustrates the values of lmDiv for BitDepthC=8. Table 13 illustrates the values of lmDiv for BitDepthC=10. There is no need for table entries corresponding to a2s<32 since lmDiv is set to 0 in this case.

TABLE 12

| a2s | 32 | 33 | 34 | 35 | 36 | 37 | 38 | 39 | 40 | 41 | 42 |
|---|---|---|---|---|---|---|---|---|---|---|---|
| lmDiv | 64 | 62 | 60 | 59 | 57 | 55 | 54 | 53 | 51 | 50 | 49 |
| a2s | 43 | 44 | 45 | 46 | 47 | 48 | 49 | 50 | 51 | 52 | 53 |
| lmDiv | 48 | 47 | 46 | 45 | 44 | 43 | 42 | 41 | 40 | 39 | 39 |
| a2s | 54 | 55 | 56 | 57 | 58 | 59 | 60 | 61 | 62 | 63 | |
| lmDiv | 38 | 37 | 37 | 36 | 35 | 35 | 34 | 34 | 33 | 33 | |

TABLE 13

| a2s | 32 | 33 | 34 | 35 | 36 | 37 | 38 | 39 | 40 | 41 | 42 |
|---|---|---|---|---|---|---|---|---|---|---|---|
| lmDiv | 256 | 248 | 241 | 234 | 228 | 221 | 216 | 210 | 205 | 200 | 195 |
| a2s | 43 | 44 | 45 | 46 | 47 | 48 | 49 | 50 | 51 | 52 | 53 |
| lmDiv | 191 | 186 | 182 | 178 | 174 | 171 | 167 | 164 | 161 | 158 | 155 |
| a2s | 54 | 55 | 56 | 57 | 58 | 59 | 60 | 61 | 62 | 63 | |
| lmDiv | 152 | 149 | 146 | 144 | 141 | 139 | 137 | 134 | 132 | 130 | |

For the lmDiv (i.e., $(2^{(BitDepthC+3)}+a2s/2)/a2s$) and a3 mentioned above, other variables that require modification are as follows:

$$a3 = a2s<32?0:\text{Clip3}(-215, 215-1, a1s*\text{lmDiv}+(1<<(k1-1)))>>k1), \quad (30)$$

$$k = \text{BitDepth}_C+3-\text{Max}(0, \text{Log } 2(\text{abs}(a3))-6). \quad (31)$$

Figure 2:
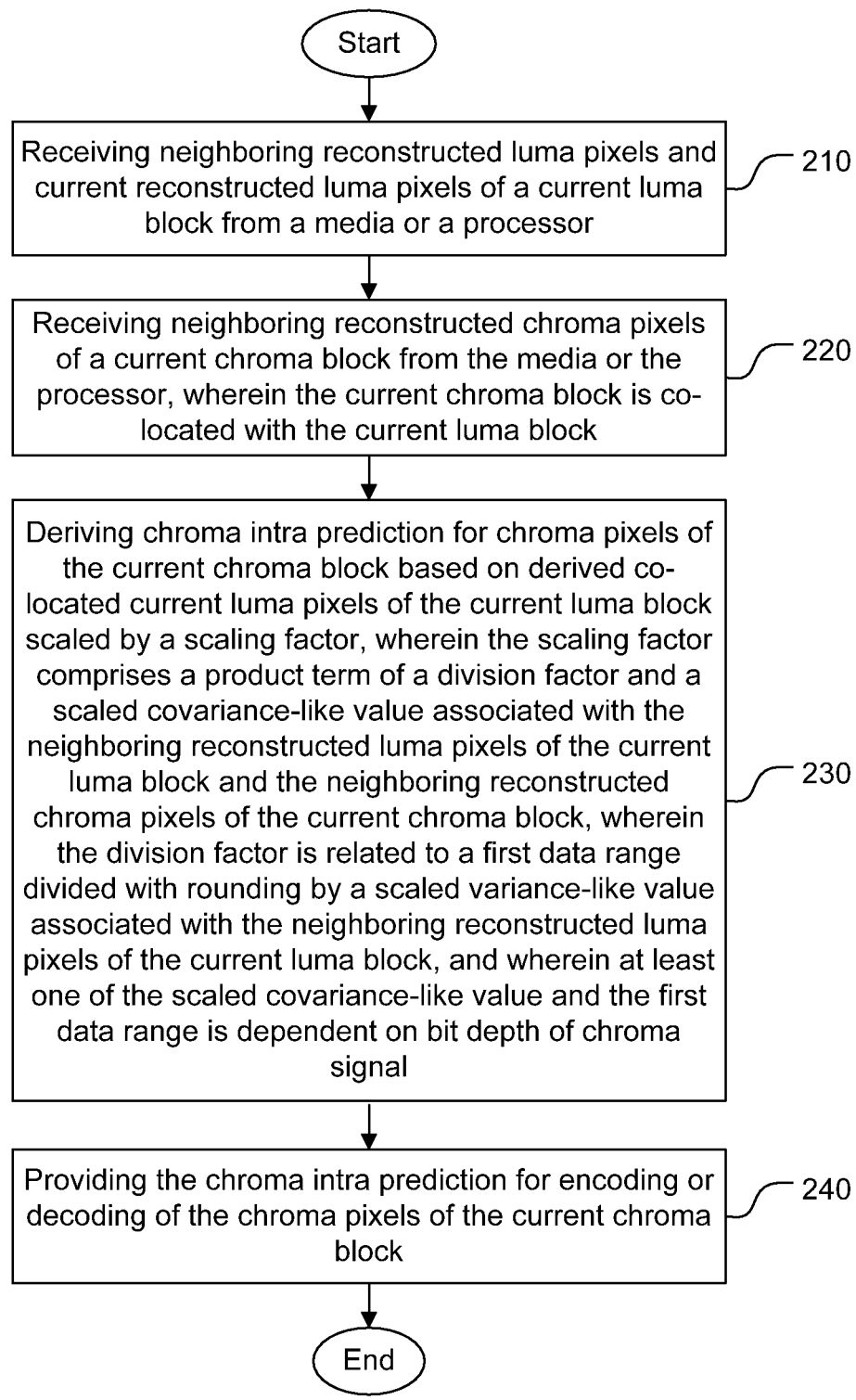
FIG. 2 illustrates an example of a flowchart for chroma intra prediction incorporating an embodiment of the present invention.

The LM-mode chroma intra prediction method described above can be used in a video encoder as well as a video decoder. FIG. 2 illustrates an exemplary flowchart of an encoder or a decoder incorporating an embodiment of the present invention. Neighboring reconstructed luma pixels and current reconstructed luma pixels of a current luma block are received from a media or a processor as shown in step 210. The reconstructed luma pixels may be retrieved from a media such as a computer memory of buffer (RAM or DRAM). The reconstructed luma pixels may also be received from a processor such as a central processing unit or a digital signal processor that reconstructs the luma pixels from residual signals. In a video encoder, the residual signals are generated by the encoder. In a video decoder, the residual signals may be derived from the received bitstream. The neighboring reconstructed chroma pixels of a current chroma block are received from a media or a processor as shown in step 220, wherein the current chroma block is co-located with the current luma block. The reconstructed luma samples and chroma samples may be retrieved from the same media (such as the same DRAM device) or separate media (such as separate DRAM devices). The reconstructed luma samples and chroma samples may be received from the same processor or different processors (such as a processor for luma samples and another processor for chroma samples). The chroma intra prediction for chroma pixels of the current chroma block is then derived based on derived co-located current luma pixels of the current luma block scaled by a scaling factor as shown in step 230. The scaling factor comprises a product term of a division factor and a scaled covariance-like value associated with the neighboring reconstructed luma pixels of the current luma block and the neighboring reconstructed chroma pixels of the current chroma block. The division factor is related to a first data range divided with rounding by a scaled variance-like value associated with the neighboring reconstructed luma pixels of the current luma block. According to the present invention, at least one of the scaled covariance-like value and the first data range is dependent on the internal bit depth with which the chroma signal is processed during video coding process. The chroma intra prediction is then provided for encoding or decoding of the chroma pixels of the current chroma block as shown in step 240.

The flowcharts shown above are intended to illustrate examples of a luma-based chroma intra prediction method for a video encoder and a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of chroma intra prediction based on reconstructed luma pixels and chroma pixels, the method comprising:
    receiving neighboring reconstructed luma pixels and current reconstructed luma pixels of a current luma block from a media or a processor;
    receiving neighboring reconstructed chroma pixels of a current chroma block from the media or the processor, wherein the current chroma block is co-located with the current luma block;
    deriving chroma intra prediction for chroma pixels of the current chroma block based on derived co-located current luma pixels of the current luma block scaled by a scaling factor, wherein the scaling factor comprises a product term of a division factor and a scaled covariance value associated with the neighboring reconstructed luma pixels of the current luma block and the neighboring reconstructed chroma pixels of the current chroma block, wherein the division factor is related to a first data range divided with rounding by a scaled variance value associated with the neighboring reconstructed luma pixels of the current luma block; and
    providing the chroma intra prediction for encoding or decoding of the chroma pixels of the current chroma block;
    wherein said scaled covariance value is derived based on a covariance value associated with the neighboring reconstructed luma pixels of the current luma block and the neighboring reconstructed chroma pixels of the current chroma block, wherein said scaled covariance value corresponds to right-shifting said covariance value by a first number of bits related to said covariance value and the internal bit depth with which chroma signal is processed during video coding process, $a1s=a1>>Max(0, Log2(abs(a1))-(BitDepth_C-2))$, wherein a1s represents said scaled covariance value, a1 represents said covariance value, and $BitDepth_C$ represents an internal bit depth with which chroma signal is processed during video coding process.

2. The method of claim 1, wherein the neighboring reconstructed luma pixels comprise a first group of the reconstructed luma pixels above a top boundary of the current luma block and a second group of the reconstructed luma pixels to a left boundary of the current luma block.

3. The method of claim 1, wherein said derived co-located current luma pixels of the current luma block are derived from the current reconstructed luma pixels of the current luma block at pixel locations co-located with the chroma pixels of the current chroma block.

4. The method of claim 1, wherein the first data range corresponds to $2^{(BitDepth_C-2)}$ or $2^{(BitDepth_C-1)}$.

5. The method of claim 1, wherein said scaled variance value is derived based on a variance value associated with the neighboring reconstructed luma pixels of the current luma block, wherein said scaled variance value corresponds to right-shifting said variance value by a second number of bits related to said variance value.

6. The method of claim 5, wherein $a2s=abs(a2>>Max(0, Log 2(abs(a2))-5))$, wherein a2s represents said scaled variance value and a2 represents said variance value.

7. The method of claim 6, wherein the division factor corresponds to $(2^{(BitDepth_C-2)}+a2s/2)/a2s$, $(2^{(BitDepth_C-1)}+a2s/2)/a2s$, $(2^{(BitDepth_C+1)}+a2s/2)/a2s$, $(2^{(BitDepth_C+2)}+a2s/2)/a2s$, $(2^{(BitDepth_C+3)}+a2s/2)/a2s$, or $(2^{(BitDepth_C+4)}+a2s/2)/a2s$.

8. The method of claim 7, wherein said derived co-located current luma pixels of the current luma block scaled by the scaling factor are right shifted by a shift factor related to the product term during said deriving chroma intra prediction for chroma pixels of the current chroma block, wherein the shift factor corresponds to $(BitDepth_C-2-Max(0, Log 2(abs(a3))-6))$, $(BitDepth_C-1-Max(0, Log 2(abs(a3))-6))$, $(BitDepth_C+1-Max(0, Log 2(abs(a3))-6))$, $(BitDepth_C+2-Max(0, Log 2(abs(a3))-6))$, $(BitDepth_C+3-Max(0, Log 2(abs(a3))-6))$, or $(BitDepth_C+4-Max(0, Log 2(abs(a3))-6))$ for a respective division factor, wherein a3 represents a processed result corresponding to the product term being right shifted with rounding and clipped to $(-2^{15}, 2^{15}-1)$ if said scaled variance value is equal to or greater than one, and wherein a3 is 0 otherwise.

9. The method of claim 7, wherein the division factor is implemented by a look-up table for a selected internal bit depth of chroma signal with the scaled variance value as a table input.

10. The method of claim 9, wherein the look-up table omits table entries for the scaled variance value from 1 to 6 in case of the division factor corresponding to either $(2^{(BitDepth_C+1)}+a2s/2)/a2s$, $(2^{(BitDepth_C+2)}+a2s/2)/a2s$ and for the scaled variance value from 1 to 31 in case of the division factor corresponding to either $(2^{(BitDepth_C+3)}+a2s/2)/a2s$, or $(2^{(BitDepth_C+4)}+a2s/2)/a2s$.

11. The method of claim 10, wherein a3 is set to 0 if a2s is less than 7 in case of the division factor corresponding to either $(2^{(BitDepth_C+1)}+a2s/2)/a2s$, $(2^{(BitDepth_C+2)}+a2s/2)/a2s$ and wherein a3 is set to 0 if a2s is less than 32 in case of the division factor corresponding to either $(2^{(BitDepth_C+3)}+a2s/2)/a2s$, or $(2^{(BitDepth_C+4)}+a2s/2)/a2s$.

12. The method of claim 10, wherein the division factor is set to a first value of the division factor corresponding to a2s equal to 7 if a2s is less than 7 or a2s is less than 7 and larger than 0, in case of the division factor corresponding to either $(2^{(BitDepth_C+1)}+a2s/2)/a2s$, $(2^{(BitDepth_C+2)}+a2s/2)/a2s$ and wherein a3 is set to a second value of the division factor corresponding to a2s equal to 32 if a2s is less than 32 or a2s is less than 32 and larger than 0, in case of the division factor corresponding to either $(2^{(BitDepth_C+3)}+a2s/2)/a2s$, or $(2^{(BitDepth_C+4)}+a2s/2)/a2s$.

13. The method of claim 1, wherein said scaled covariance value is derived based on a covariance value associated with the neighboring reconstructed luma pixels of the current luma block and the neighboring reconstructed chroma pixels of the current chroma block, wherein said scaled covariance value corresponds to right-shifting said covariance value by a first number of bits related to said covariance value and an internal bit depth with which chroma signal is processed during video coding process.

14. The method of claim 13, wherein $a1s=a1>>Max(0, Log 2(abs(a1))-(BitDepth_C-2))$, wherein a1s represents said scaled covariance value, a1 represents said covariance value, and $BitDepth_C$ represents an internal bit depth with which chroma signal is processed during video coding process.

15. The method of claim 14, wherein the first data range corresponds to $2^{(BitDepth_C-2)}$ or $2^{(BitDepth_C-1)}$.

16. An apparatus of chroma intra prediction based on reconstructed luma pixels and chroma pixels, the apparatus comprising:
    at least one circuit, the at least one circuit configured for:
        receiving neighboring reconstructed luma pixels and current reconstructed luma pixels of a current luma block from a media or a processor;

receiving neighboring reconstructed chroma pixels of a current chroma block from the media or the processor, wherein the current chroma block is co-located with the current luma block;

deriving chroma intra prediction for chroma pixels of the current chroma block based on derived co-located current luma pixels of the current luma block scaled by a scaling factor, wherein the scaling factor comprises a product term of a division factor and a scaled covariance value associated with the neighboring reconstructed luma pixels of the current luma block and the neighboring reconstructed chroma pixels of the current chroma block, wherein the division factor is related to a first data range divided with rounding by a scaled variance value associated with the neighboring reconstructed luma pixels of the current luma block; and providing the chroma intra prediction for encoding or decoding of the chroma pixels of the current chroma block;

wherein said scaled covariance value is derived based on a covariance value associated with the neighboring reconstructed luma pixels of the current luma block and the neighboring reconstructed chroma pixels of the current chroma block, wherein said scaled covariance value corresponds to right-shifting said covariance value by a first number of bits related to said covariance value and the internal bit depth with which chroma signal is processed during video coding process, $a1s=a1>>\text{Max}(0, \text{Log } 2(\text{abs}(a1))-(\text{BitDepth}_C-2))$, wherein $a1s$ represents said scaled covariance value, $a1$ represents said covariance value, and $\text{BitDepth}_C$ represents an internal bit depth with which chroma signal is processed during video coding process.

17. The apparatus of claim 16, wherein the neighboring reconstructed luma pixels comprise a first group of the reconstructed luma pixels above a top boundary of the current luma block and a second group of the reconstructed luma pixels to a left boundary of the current luma block.

18. The apparatus of claim 16, wherein said derived co-located current luma pixels of the current luma block are derived from the current reconstructed luma pixels of the current luma block at pixel locations co-located with the chroma pixels of the current chroma block.

19. The apparatus of claim 16, wherein the first data range corresponds to $2^{\wedge}(\text{BitDepth}_C-2)$ or $2^{\wedge}(\text{BitDepth}_C-1)$.

20. The apparatus of claim 16, wherein said scaled variance value is derived based on a variance value associated with the neighboring reconstructed luma pixels of the current luma block, wherein said scaled variance value corresponds to right-shifting said variance value by a second number of bits related to said variance value.

21. A method of chroma intra prediction based on reconstructed luma pixels and chroma pixels, the method comprising:

receiving neighboring reconstructed luma pixels and current reconstructed luma pixels of a current luma block from a media or a processor;

receiving neighboring reconstructed chroma pixels of a current chroma block from the media or the processor, wherein the current chroma block is co-located with the current luma block;

deriving chroma intra prediction for chroma pixels of the current chroma block based on derived co-located current luma pixels of the current luma block scaled by a scaling factor, wherein the scaling factor comprises a product term of a division factor and a scaled covariance value associated with the neighboring reconstructed luma pixels of the current luma block and the neighboring reconstructed chroma pixels of the current chroma block, wherein the division factor is related to a first data range divided with rounding by a scaled variance value associated with the neighboring reconstructed luma pixels of the current luma block; and providing the chroma intra prediction for encoding or decoding of the chroma pixels of the current chroma block;

wherein said scaled variance value is derived based on a variance value associated with the neighboring reconstructed luma pixels of the current luma block, wherein said scaled variance value corresponds to right-shifting said variance value by a second number of bits related to said variance value, $a2s=\text{abs}(a2>>\text{Max}(0, \text{Log } 2(\text{abs}(a2))-5))$, wherein $a2s$ represents said scaled variance value and $a2$ represents said variance value.

22. The method of claim 21, wherein the division factor corresponds to $(2^{\wedge}(\text{BitDepth}_C-2)+a2s/2)/a2s$, $(2^{\wedge}(\text{BitDepth}_C-1)+a2s/2)/a2s$, $(2^{\wedge}(\text{BitDepth}_C+1)+a2s/2)/a2s$, $(2^{\wedge}(\text{BitDepth}_C+2)+a2s/2)/a2s$, $(2^{\wedge}(\text{BitDepth}_C+3)+a2s/2)/a2s$, or $(2^{\wedge}(\text{BitDepth}_C+4)+a2s/2)/a2s$, and $\text{BitDepth}_C$ represents an internal bit depth with which chroma signal is processed during video coding process.

23. The method of claim 22, wherein said derived co-located current luma pixels of the current luma block scaled by the scaling factor are right shifted by a shift factor related to the product term during said deriving chroma intra prediction for chroma pixels of the current chroma block, wherein the shift factor corresponds to $(\text{BitDepth}_C-2-\text{Max}(0, \text{Log } 2(\text{abs}(a3))-6))$, $(\text{BitDepth}_C-1-\text{Max}(0, \text{Log } 2(\text{abs}(a3))-6))$, $(\text{BitDepth}_C+1-\text{Max}(0, \text{Log } 2(\text{abs}(a3))-6))$, $(\text{BitDepth}_C+2-\text{Max}(0, \text{Log } 2(\text{abs}(a3))-6))$, $(\text{BitDepth}_C+3-\text{Max}(0, \text{Log } 2(\text{abs}(a3))-6))$, or $(\text{BitDepth}_C+4-\text{Max}(0, \text{Log } 2(\text{abs}(a3))-6))$ for a respective division factor, wherein $a3$ represents a processed result corresponding to the product term being right shifted with rounding and clipped to $(-2^{15}, 2^{15}-1)$ if said scaled variance value is equal to or greater than one, and wherein $a3$ is 0 otherwise.

24. The method of claim 22, wherein the division factor is implemented by a look-up table for a selected internal bit depth of chroma signal with the scaled variance value as a table input.

25. The method of claim 24, wherein the look-up table omits table entries for the scaled variance value from 1 to 6 in case of the division factor corresponding to either $(2^{\wedge}(\text{BitDepth}_C+1)+a2s/2)/a2s$, $(2^{\wedge}(\text{BitDepth}_C+2)+a2s/2)/a2s$ and for the scaled variance value from 1 to 31 in case of the division factor corresponding to either $(2^{\wedge}(\text{BitDepth}_C+3)+a2s/2)/a2s$, or $(2^{\wedge}(\text{BitDepth}_C+4)+a2s/2)/a2s$.

26. The method of claim 25, wherein $a3$ is set to 0 if $a2s$ is less than 7 in case of the division factor corresponding to either $(2^{\wedge}(\text{BitDepth}_C+1)+a2s/2)/a2s$, $(2^{\wedge}(\text{BitDepth}_C+2)+a2s/2)/a2s$ and wherein $a3$ is set to 0 if $a2s$ is less than 32 in case of the division factor corresponding to either $(2^{\wedge}(\text{BitDepth}_C+3)+a2s/2)/a2s$, or $(2^{\wedge}(\text{BitDepth}_C+4)+a2s/2)/a2s$.

27. The method of claim 25, wherein the division factor is set to a first value of the division factor corresponding to $a2s$ equal to 7 if $a2s$ is less than 7 or $a2s$ is less than 7 and larger than 0, in case of the division factor corresponding to either $(2^{\wedge}(\text{BitDepth}_C+1)+a2s/2)/a2s$, $(2^{\wedge}(\text{BitDepth}_C+2)+a2s/2)/a2s$ and wherein $a3$ is set to a second value of the division factor corresponding to $a2s$ equal to 32 if $a2s$ is less than 32 or $a2s$ is less than 32 and larger than 0, in case of the division factor corresponding to either $(2^{\wedge}(\text{BitDepth}_C+3)+a2s/2)/a2s$, or $(2^{\wedge}(\text{BitDepth}_C+4)+a2s/2)/a2s$.

28. The method of claim 21, wherein the neighboring reconstructed luma pixels comprise a first group of the reconstructed luma pixels above a top boundary of the current luma block and a second group of the reconstructed luma pixels to a left boundary of the current luma block.

29. The method of claim 21, wherein said derived co-located current luma pixels of the current luma block are derived from the current reconstructed luma pixels of the current luma block at pixel locations co-located with the chroma pixels of the current chroma block.

30. An apparatus of chroma intra prediction based on reconstructed luma pixels and chroma pixels, the apparatus comprising:
- at least one circuit, the at least one circuit configured for:
- receiving neighboring reconstructed luma pixels and current reconstructed luma pixels of a current luma block from a media or a processor;
- receiving neighboring reconstructed chroma pixels of a current chroma block from the media or the processor, wherein the current chroma block is co-located with the current luma block;
- deriving chroma intra prediction for chroma pixels of the current chroma block based on derived co-located current luma pixels of the current luma block scaled by a scaling factor, wherein the scaling factor comprises a product term of a division factor and a scaled covariance value associated with the neighboring reconstructed luma pixels of the current luma block and the neighboring reconstructed chroma pixels of the current chroma block, wherein the division factor is related to a first data range divided with rounding by a scaled variance value associated with the neighboring reconstructed luma pixels of the current luma block; and
- providing the chroma intra prediction for encoding or decoding of the chroma pixels of the current chroma block;
- wherein said scaled variance value is derived based on a variance value associated with the neighboring reconstructed luma pixels of the current luma block, wherein said scaled variance value corresponds to right-shifting said variance value by a second number of bits related to said variance value, a2s=abs(a2>>Max(0, Log 2(abs (a2))−5)), wherein a2s represents said scaled variance value and a2 represents said variance value.

* * * * *